BEST AVAILABLE COPY

Nov. 12, 1968 R. L. ELLIOTT 3,410,500

TAPE REEL

Filed Jan. 30, 1967 2 Sheets-Sheet 1

INVENTOR
Robert L. Elliott

BY Shoemaker and Mattare

ATTORNEYS

Nov. 12, 1968 R. L. ELLIOTT 3,410,500

TAPE REEL

Filed Jan. 30, 1967 2 Sheets-Sheet 2

INVENTOR

Robert L. Elliott

BY Shoemaker and Mattare

ATTORNEYS 3,410,500
TAPE REEL

Robert L. Elliott, Opelika, Ala., assignor to Perfection Plastics, Inc., Opelika, Ala., a corporation of Alabama
Filed Jan. 30, 1967, Ser. No. 612,460
10 Claims. (Cl. 242—71.8)

ABSTRACT OF THE DISCLOSURE

A reel for receiving tape comprises a rigid preferably metal hub with spaced apart outer and inner flanges connected by a web with holes therein, reel flanges with similar concentric skirts surrounding and secured about the outer hub flange, and one of the reel flanges having spaced tapered pin slots extending into and beyond the holes in the hub web and into which pin slots an annular bead is inserted and expands said pin slots thus to firmly engage the same with walls defining the said holes in the web.

*Background of the invention*

The present invention relates to a reel for receiving magnetic tape or the like thereon. Prior art tape reels employing plastic material have generally been of all plastic construction. These types of reels are often subjected to abuse and rough handling which has resulted in excessive breakage at the radially inward parts of the hub portions thereof.

Additionally, the flange portions of such reel are formed of transparent material so that the amount of tape on the reel may be readily observed in cooperation with suitable indicating means generally provided on the flange portions of the reel. Where the parts of the reel are adhesively secured to one another, this results in an aesthetically unpleasing appearance since the adhesive material is readily visible through each of the transparent flange portions.

Additionally, where the reels are formed of a plurality of members, they are generally adhesively secured to one another. The adhesive bond of such members is not always adequate to retain the members firmly in contact with one another.

*Summary of the invention*

In the present invention, the reel is formed of three separate components including a metallic hub and a front flange portion and a rear flange portion each formed of plastic material. The metallic hub is of much more rugged construction than a plastic hub thereby substantially eliminating the hazard of breaking the reel at the hub portion thereof as has occurred in the prior art.

Additionally, one of the flange portions of the present invention is formed of opaque material, and in particular, the skirt portion of the rear flange portion is opaque thereby hiding from view the interfaces between the skirt portions as well as the interface between the hub and one of the skirt portions so that the bond between the skirt portions and the filler material disposed about the hub portion is not readily visible. This results in a much more pleasing appearance from an aesthetic standpoint.

The two flange portions and the hub portion are all physically clamped together by the interengagement of the various parts so as to afford a wedging effect thereby providing a good structural interconnection between the three components of the tape reel. Additionally, the skirt portions of the two flange portions are bonded to one another to provide an additional interconnection therebetween thereby serving to further rigidify and strengthen the over-all construction.

An object of the present invention is to provide a new and novel tape reel which includes a rigid hub portion and less rigid outer portions; and wherein certain portions are transparent and certain other portions are opaque for aesthetic reasons; and further wherein the various components of the tape reel are securely connected to one another.

*Description of the preferred embodiment*

Figure 1:
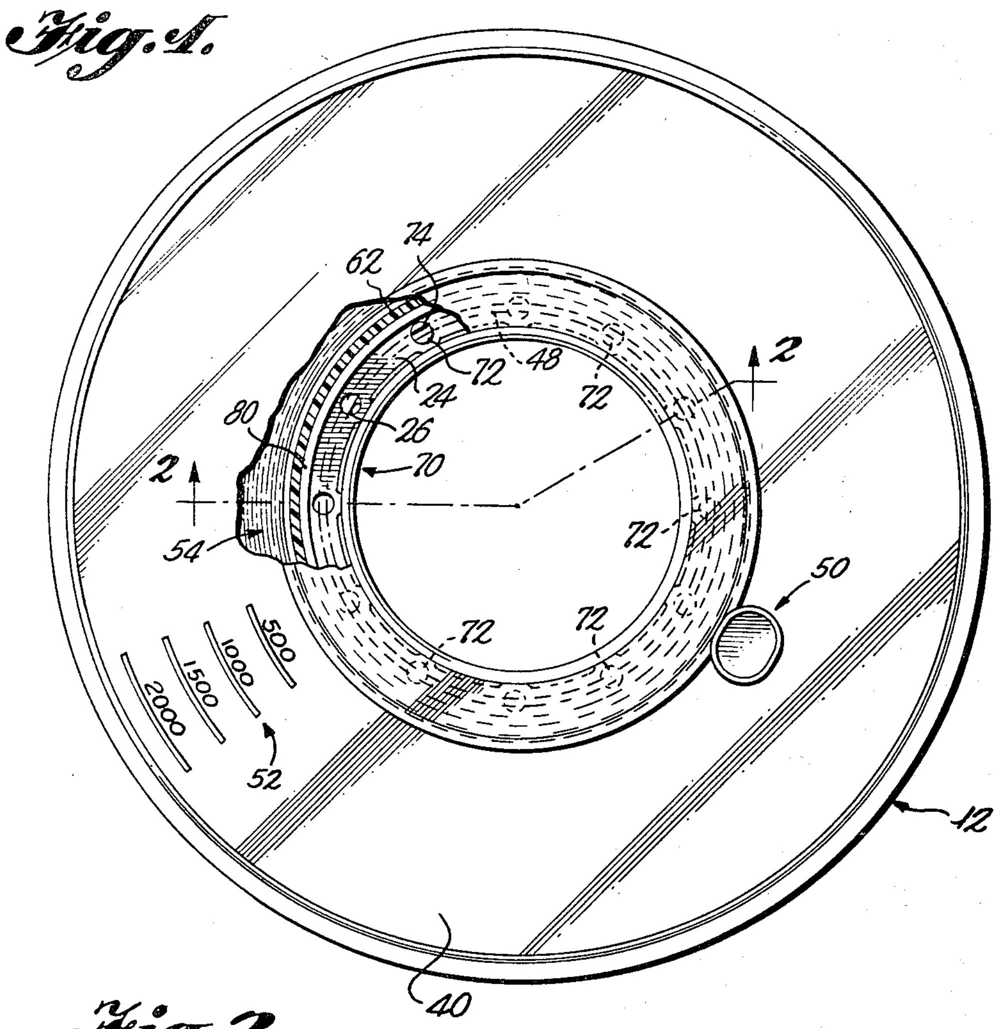
FIG. 1 is a plan view of a tape reel according to the present invention with portions thereof broken away for the purpose of illustration.

Referring now to the drawings wherein like reference characters designate corresponding parts throughout the several views, the tape reel of the present invention includes a hub portion indicated generally by reference numeral 10, a front flange portion indicated generally by reference numeral 12, and a rear flange portion indicated generally by reference numeral 14. The hub portion is formed of a suitable rigid material of a metallic substance such as aluminum or the like. Each of the flange portions 12 and 14 are formed of a suitable plastic material such as general purpose polystyrene. Other suitable materials for use as the front and rear flange portions are for example styrene, acrylonitrile, polycarbonate, and modified styrene resins which give higher impact resistance. Other suitable materials having similar characteristics may be employed.

One of the flange portions is transparent and the other opaque. In the preferred embodiment, the front flange portion 12 is formed of transparent plastic material, while the rear flange portion 14 is formed of opaque material.

Figure 3:
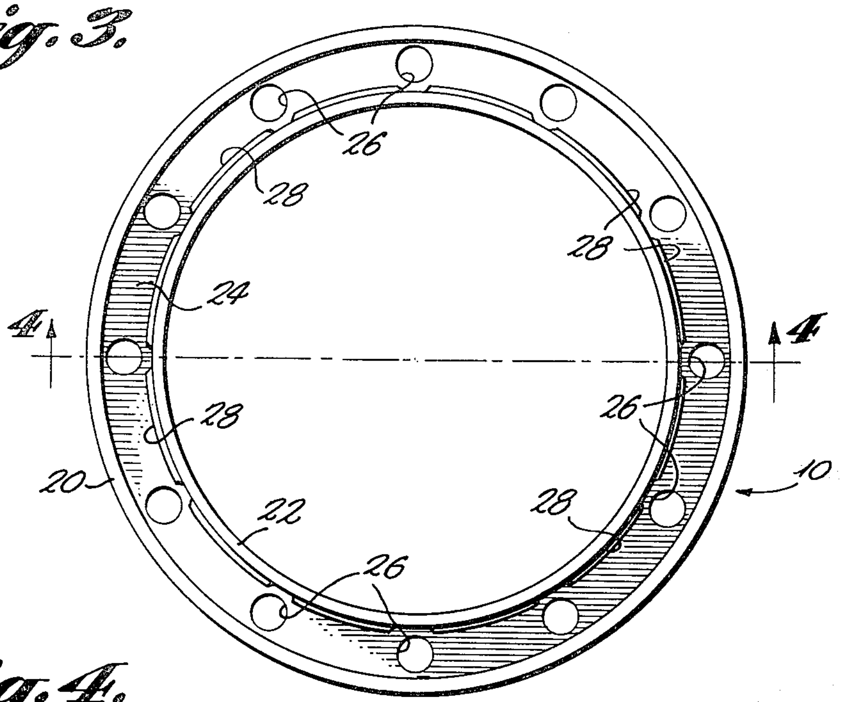
FIG. 3 is a plan view of the hub portion of the tape reel.
Figure 4:
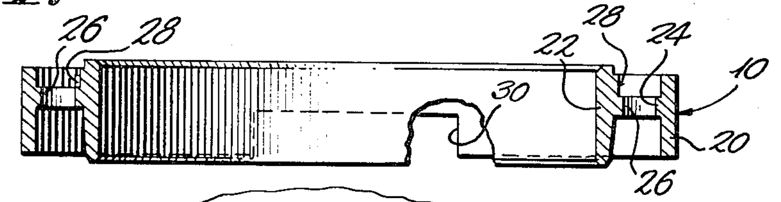
FIG. 4 is a sectional view taken substantially along line 4—4 of FIG. 3 looking in the direction of the arrows.

Referring now particularly to FIGS. 3 and 4 of the drawing, the construction of the hub portion may be clearly understood. The hub portion 10 includes an outer generally cylindrical wall 20 and an inner generally cylindrical wall 22, the two walls being substantially concentric and having a web portion 24 extending therebetween and being disposed substantially normally to the two walls 20 and 22. Web portion 24 has a plurality of spaced holes 26 formed therethrough, the holes being illustrated as twelve in number. It should be understood that the number of holes may be varied as required in accordance with conventional design requirements, and also that the number of pins extending through these holes as described hereinafter may also be varied as desired. A plurality of radially outwardly extending lugs 28 are formed on the outer periphery of inner wall 22 and are disposed between holes 26 as seen most clearly in FIG. 3.

As seen in FIG. 4, the outer wall 20 of the hub portion is provided with a slot 30 adapted to receive a lug formed on the rear flange portion as hereinafter described for aligning the hub portion with respect to the rear flange portion.

Figure 2:
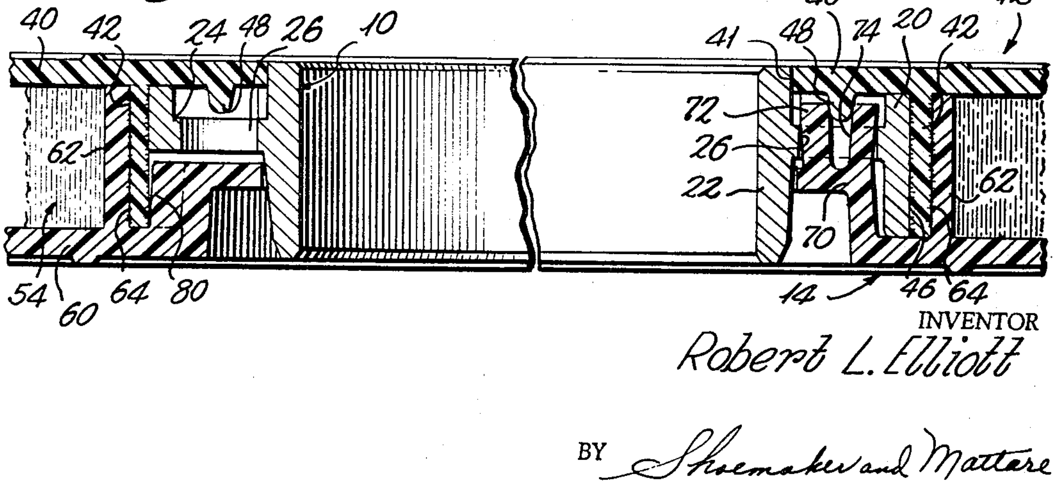
FIG. 2 is a sectional view taken substantially along line 2—2 of FIG. 1 looking in the direction of the arrows.

Referring now to FIG. 2, the front flange portion 12 includes a substantially flat wall 40 having a central hole 41 formed therethrough which fits relatively snugly about the outer surface of outer wall 20 of the hub portion. An integral skirt portion 42 of generally cylindrical configuration extends substantially perpendicularly from wall 40. The inner periphery of skirt portion 42 is adapted to fit relatively snugly about the outer periphery of the hub portion 20. A body of filler material 46 is disposed between the outer periphery of the hub portion and the inner periphery of the skirt portion on the front flange portion so as to fill any void spaces therebetween which might allow movement of the hub portion within the skirt portion. Any suitable structural adhesive material is satisfactory for this purpose.

Projection means in the form of an annular bead 48 is provided, this bead extending substantially perpendicularly from the same side of wall 40 as skirt portion 42. Bead 48 is tapered to a smaller dimension in a direction away from wall 40 for a purpose hereinafter described.

As seen in FIG. 1, the outwardly facing surface of wall 40 of the front flange portion is provided with a finger hole 50 as is conventional, and suitable indicia indicated generally by reference numeral 52 are formed integral with the front flange portion to indicate the amount of tape disposed on the reel. The tape is illustrated generally by reference numeral 54.

Referring again to FIG. 2, the rear flange portion 14 includes a wall 60 having a generally cylindrical skirt portion 62 extending substantially perpendicularly therefrom. Skirt portion 62 is adapted to fit relatively snugly about skirt portion 42, the two skirt portions being of substantially the same length so that the outer end of skirt portion 42 is in contact with the inwardly facing surface of wall 60 of the rear flange portion, while the other end of skirt portion 62 is in contact with the inwardly facing surface of the wall portion 40 of the front flange portion.

The outer periphery of skirt portion 42 and the inner periphery of skirt portion 62 are bonded to one another. This may be accomplished in any conventional manner such as by employing a glue composed of a solvent which decomposes the molecular structure of the plastic material along the inner faces of these skirt portions to cause fusion between the plastic parts.

Figure 5:
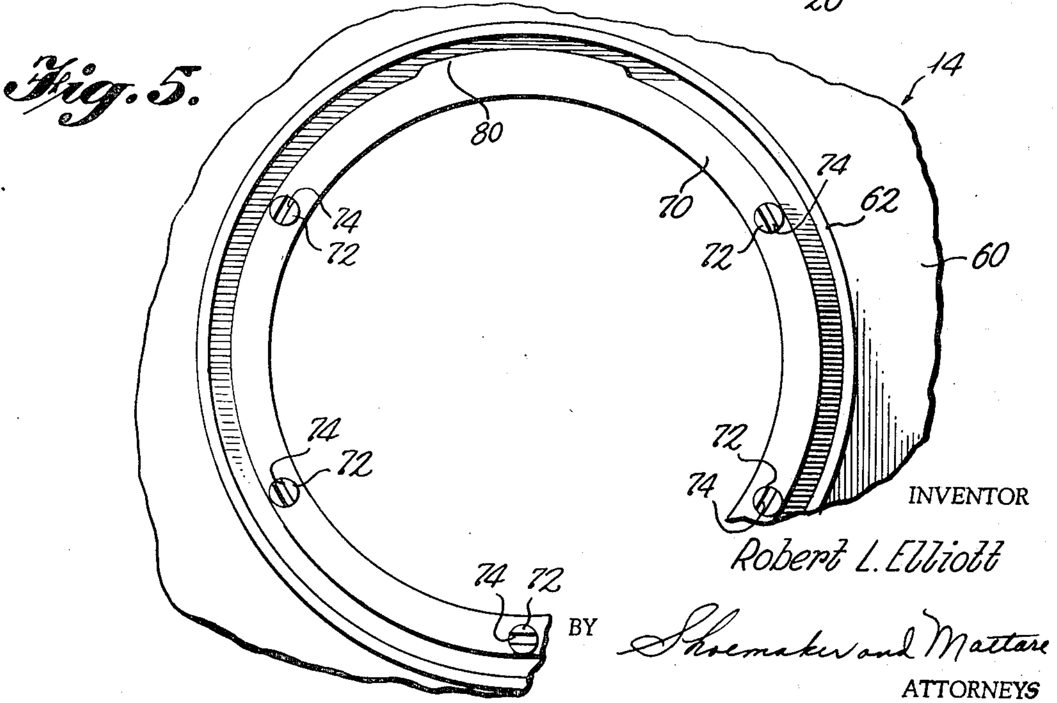
FIG. 5 is a plan view of the central portion of the rear flange portion of the tape reel.

At the radially inward portion of the rear flange portion, an annular portion 70 extends substantially perpendicularly inwardly of wall 60, this annular portion 70 as seen most clearly in FIG. 5 having a plurality of spaced pin portions 72 extending therefrom. Each of these pin portions is generally cylindrical in outer configuration and has a tapered slot 74 formed therein. Each of these tapered slots 74 as seen in FIG. 2 is tapered substantially complementary to the taper formed on the annular bead 48 and is adapted to receive such annular bead 48. It is apparent as seen in FIG. 2 that when the front and rear flange portions are assembled in the relationship shown, the coaction between the tapered bead and the tapered slots formed in the pin portions will cause the pin portions to be expanded or wedged outwardly into engagement with the wall portion of the associated hole 28 in the hub portion to provide a good physical interconnection therebetween.

It is of course understood that the number of pin portions may be varied as desired, the pin portions being suitably spaced so that each of these pin portions is received within one of the holes formed in the hub portion. For example, if desired, the rear flange portion could be provided with twelve pin portions so that one pin portion would be received within each of the holes 26 in the hub portion.

As seen in FIG. 5, an outwardly extending lug 80 is formed integral with portion 70 of the rear flange portion, this lug being received within the slot 30 defined in the outer wall 20 of the hub portion, whereby the rear flange portion and hub portion can only be assembled in one position relative to one another thereby accurately positioning these components.

It is apparent from the foregoing that there is provided according to the present invention a new and novel tape reel including a rigid metallic hub portion and less rigid plastic flange portions. This affords maximum versatility and ruggedness to the over-all construction. The metallic hub portion substantially eliminates the hazard of breakage occurring at the hub portion. The front flange portion is transparent, while the rear flange portion is opaque, it being noted that the skirt portion of the rear flange portion overlies the skirt portion of the front flange portion whereby the opaque skirt portion of the rear flange portion substantially hides from view the interfaces having the adhesive substances applied thereto. The various components of the tape reel are securely connected to one another both by a physical wedge interconnection as well as being chemically bonded to one another along certain interfaces thereof.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A tape reel comprising a relatively rigid hub portion having a plurality of spaced holes formed therethrough, a separate front flange portion and a separate rear flange portion, said front flange portion including a skirt portion disposed around said hub portion, said front flange portion also including a projection means extending from one side thereof, said rear flange portion including a skirt portion disposed around said hub portion and having a plurality of pin portions extending from one side thereof, at least some of said pin portions having a slot formed therein, said pin portions extending through certain ones of said holes in said hub portion, said projection means projecting into the slots of said pin portions and said pin portions being in engagement with the walls of the holes in said hub portion.

2. Apparatus as defined in claim 1 wherein the skirt portions of said front flange portion and said rear flange portion are in engagement with one another and are bonded to one another.

3. Apparatus as defined in claim 1 wherein said projection means comprises an annular bead extending from one side of said front flange portion, said annular bead being tapered, the slots in said pin portions also being tapered in a corresponding manner to receive the tapered bead on said front flange portion.

4. Apparatus as defined in claim 1 wherein the skirt portion on said front flange portion is of generally cylindrical configuration and extends substantially perpendicularly from one side of said front flange portion, the skirt portion on said rear flange portion also being of generally cylindrical configuration and extending substantially perpendicularly from one side of said rear flange portion.

5. Apparatus as defined in claim 4 wherein the skirt portion on said front flange portion fits about and engages the outer periphery of said hub portion, the skirt portion on said rear flange portion fitting about and being in engagement with the outer periphery of the skirt portion on said front flange portion.

6. Apparatus as defined in claim 4 wherein a filler material is disposed between the outer periphery of said hub portion and the inner periphery of the skirt on said front flange portion to completely fill the space therebetween.

7. Apparatus as defined in claim 4 wherein the outer periphery of the skirt portion on said front flange portion and the inner periphery of the skirt portion on said rear flange portion are bonded to one another.

8. Apparatus as defined in claim 1 wherein said hub portion includes a pair of spaced generally cylindrical wall portions having a central web portion extending therebetween, said holes in the hub portion being formed through said web portion.

9. Apparatus as defined in claim 8 wherein one of said cylindrical wall portions has a slot formed therein, said rear flange portion having a lug formed thereon and received within said last-mentioned slot for accurately positioning said hub portion and said rear flange portion with respect to one another.

10. Apparatus as defined in claim 1 wherein said hub portion is formed of metallic material and said front flange portion and said rear flange portion are each formed of plastic material, said front flange portion being substantially transparent and said rear flange portion being substantially opaque, said hub portion including a pair of generally cylindrical spaced wall portions having a web portion extending therebetween, the holes in said hub portion being formed through said web portion, the skirt portion of said front flange portion being generally cylindrical and extending substantially perpendicularly from one side thereof and fitting snugly about the outer periphery of said hub portion, a filler material disposed between the outer periphery of said hub portion and the inner periphery of the skirt portion of said front flange portion for completely filling the space therebetween, said projection means on said front flange portion comprising a tapered annular bead extending from the same side of said front flange portion as the skirt portion thereof, the skirt portion on said rear flange portion being of generally cylindrical configuration and extending substantially perpendicularly from one side thereof and fitting snugly about the outer periphery of the skirt portion of said front flange portion, the outer periphery of the skirt portion of said front flange portion and the inner periphery of the skirt portion of said rear flange portion being bonded to one another, said plurality of pin portions on said rear flange portion being formed on an annular portion extending substantially perpendicularly from one side of said rear flange portion, the slots in said pin portions being tapered to receive said tapered annular bead, said pin portions extending through said holes in said central web portion of the hub portion and being in engagement with the wall portions of such holes.

References Cited

UNITED STATES PATENTS

| | | | |
|---|---|---|---|
| 3,088,689 | 5/1963 | Perlini | 242—71.8 |
| 3,236,473 | 2/1966 | Hultgren | 242—71.8 |
| 3,346,211 | 10/1967 | Gruber | 242—71.8 |

STANLEY N. GILREATH, *Primary Examiner.*

N. L. MINTZ, *Assistant Examiner.*